United States Patent
Holm

(10) Patent No.: US 9,955,670 B2
(45) Date of Patent: May 1, 2018

(54) DEVICE FOR AUTOMATICALLY FEEDING CALVES

(71) Applicant: Hans Joachim Holm, Westerronfeld (DE)

(72) Inventor: Hans Joachim Holm, Westerronfeld (DE)

(73) Assignees: Hans Joachim Laue, Osterroenfeld (DE); Hans Joachim Holm, Westerroenfeld (DE)

(*) Notice: Subject to any disclaimer, the term of this patent is extended or adjusted under 35 U.S.C. 154(b) by 208 days.

(21) Appl. No.: 14/730,509

(22) Filed: Jun. 4, 2015

(65) Prior Publication Data
US 2015/0351364 A1    Dec. 10, 2015

(51) Int. Cl.
| | |
|---|---|
| *A01K 9/00* | (2006.01) |
| *A01K 29/00* | (2006.01) |
| *A01K 5/02* | (2006.01) |
| *A01K 7/02* | (2006.01) |

(52) U.S. Cl.
CPC ............. *A01K 9/005* (2013.01); *A01K 5/02* (2013.01); *A01K 7/02* (2013.01); *A01K 9/00* (2013.01); *A01K 29/00* (2013.01)

(58) Field of Classification Search
CPC .......... A01K 9/00; A01K 9/005; A01K 29/00; A01K 5/02; A01K 5/0275; A01K 5/0291; A01K 7/02; A01K 5/0216
See application file for complete search history.

(56) References Cited

U.S. PATENT DOCUMENTS

| | | | | |
|---|---|---|---|---|
| 3,830,203 A | * | 8/1974 | Murphy ................... | A01K 9/00 119/51.11 |
| 4,653,432 A | * | 3/1987 | Smeds ................. | A01K 5/0216 119/71 |
| 4,788,940 A | * | 12/1988 | Forster ..................... | A01K 9/00 119/71 |
| 4,803,955 A | * | 2/1989 | Gonsalves ............... | A01K 9/00 119/71 |
| 4,993,365 A | * | 2/1991 | Weerstra .................. | A01K 9/00 119/51.02 |

(Continued)

FOREIGN PATENT DOCUMENTS

| | | |
|---|---|---|
| DE | 19850536 A1 | 5/2000 |
| DE | 102008050715 A1 | 4/2010 |

(Continued)

*Primary Examiner* — Trinh T Nguyen
(74) *Attorney, Agent, or Firm* — Mayer & Williams PC; Stuart H. Mayer

(57) ABSTRACT

Device for automatically feeding calves with a mixing container for mixing a liquid food product, a teat, a connection line, which connects the mixing container with the teat, a branch line, which branches off from the connection line at a branch point and connects the connection line with a pump and a controller for controlling the pump, where a sensor is arranged on the teat, which is connected with the controller and is designed to detect a movement and/or deformation of the teat, and the controller is designed to control the pump during detection of a movement and/or deformation of the teat such that liquid food product is delivered out of the branch line towards the branch point until liquid food product exits the teat.

12 Claims, 1 Drawing Sheet

(56) References Cited

U.S. PATENT DOCUMENTS

| | | | | |
|---|---|---|---|---|
| 5,355,833 A | * | 10/1994 | Legrain | A01K 9/00 119/51.02 |
| 5,551,374 A | * | 9/1996 | Wells | A01K 9/00 119/57.92 |
| 6,016,769 A | | 1/2000 | Forster | |
| 6,360,691 B1 | * | 3/2002 | Laue | A01K 5/0216 119/57.92 |
| 2011/0126772 A1 | * | 6/2011 | Arnerup | A01K 9/00 119/72 |

FOREIGN PATENT DOCUMENTS

| | | |
|---|---|---|
| GB | 2463572 A | 3/2010 |
| WO | 95/19701 | 7/1995 |

\* cited by examiner

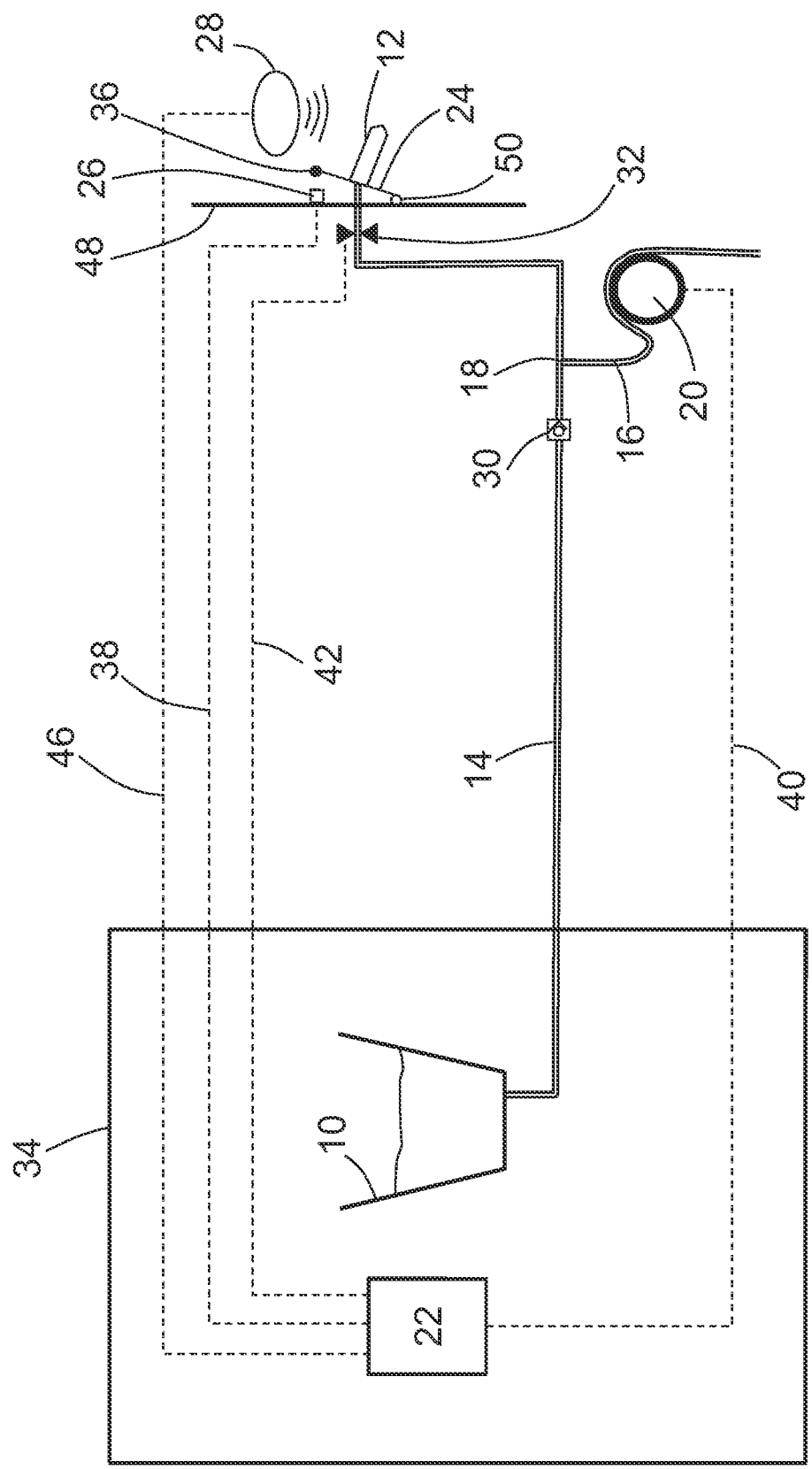

DEVICE FOR AUTOMATICALLY FEEDING CALVES

BACKGROUND OF THE INVENTION

The invention relates to a device for automatically feeding calves with a mixing container for mixing a liquid food product and a teat, which is connected with the mixing container via a connection line.

Such a device, which should enable a simultaneous feeding of several calves, became known from the publication DE 10 2008 050 715 A1. For this, the known device has several extraction points, each with one teat. A suction detection device is assigned to each teat. If an animal sucks on a teat, a hose pump integrated into a connection line between teat and mixing container is activated, whereby the sucking of the calves should be facilitated. Alternatively, the hose pump can be started manually by means of a push-button device in order to supply a food product to train the calves.

A device for automatically feeding calves with a connection line, which connects a mixing container with a teat, became known from the publication DE 198 50 536 A1. A branch line branches off from the connection line, in which a pump is arranged. By means of the pump, long connection lines in particular can be filled with liquid food product without a calf needing to suck the liquid through the entire connection line. Moreover, the connection line can be emptied by means of the pump or rinsed with a cleaning fluid. The operating direction of the pump should be reversible in order to press liquid food product into the teat to train young calves, so that the young calf is encouraged to drink or respectively suck due to the dripping of the food product.

SUMMARY OF THE INVENTION

Based on this background, the object of the invention is to provide a device for automatically feeding calves, which enables an automatic training of young calves.

The device serves to automatically feed calves and has
a mixing container for mixing a liquid food product,
a teat,
a connection line, which connects the mixing container with the teat,
a branch line, which branches off from the connection line at a branch point and connects the connection line with a pump and
a controller for controlling the pump, wherein
a sensor is arranged on the teat, which is connected with the controller and is designed to detect a movement and/or deformation of the teat, and
the controller is designed to control the pump during detection of a movement and/or deformation of the teat such that liquid food product is delivered out of the branch line towards the branch point until liquid food product exits the teat.

In the invention, a few drops or a small splash of liquid food product can be automatically dispensed from the teat when an animal moves or deforms the teat. Such a "training process" can encourage in particular very young calves, which are not yet familiar with sucking on a teat, to suck and drink. For this, no manual intervention is required by a farmer or other caregiver so that young calves can automatically be taught at any time, night or day.

At the same time, the natural sucking on the teat, during which the animal sucks the liquid food product through the connection line, is not hindered by a delivery apparatus arranged in the connection line.

Before the delivery of the liquid food product towards the branch point is executed, the pump can first be controlled so that the branch line is entirely or partially filled with liquid food product. For this, the pump can suck the liquid food product out of the mixing container via the connection line. After a movement and/or deformation of the teat has been detected, the pump is then controlled in the opposite direction.

In one embodiment, the sensor is arranged such that it detects a raising of the teat. In this case, a training process can then be triggered when a young animal pushes against the teat from below, which corresponds with the natural behavior of calves. This can occur in particular when the animal first raises the teat during a drinking process. In the case of further lifting, further pumping can be forgone.

In one embodiment, the teat is fastened on a moveably mounted holder and the sensor is arranged such that it detects a movement of the holder. The holder can be a holding plate, for example. The teat can be inserted for example through an opening in the holder and fastened to it. The holder is moveably mounted, for example pivotably around a horizontal axis. For this, the holder can be articulated for example on a wall, for example on a calf crate. A moveably mounted holder simplifies the identification of a movement of the teat.

In one embodiment, the sensor is arranged within the teat. This variant is particularly suited to identify a deformation of the teat, in particular when a young animal pushes the teat together, for example when it bites on it. In this case, a training process of the described type can also be helpful in order to persuade the young animal to suck.

In one embodiment, the sensor is a magnetic switch. For example, a reed contact can be used, which works together with a magnet on the teat or on the moveably mounted holder, or vice versa. A magnetic switch is particularly reliable and immune to dirt.

In one embodiment, the sensor is a proximity sensor. A movement and/or deformation of the teat can also be detected with a proximity switch.

In one embodiment, the controller is designed to control the pump during detection of a movement and/or deformation of the teat such that the liquid food product is delivered for a specified period of time in the range of 0.1 s to 2 s and the pump is then switched off. The period of time can be synchronized in particular with the capacity of the pump and the volume of the connection line between the branch point and the teat such that a small amount of liquid food product reliably exits the teat, but not more. A reliable training process that avoids unnecessary contaminations is achieved by specifying a corresponding period of time with particularly simple means.

In one embodiment, the device has an animal detection device, which is connected with the controller. The controller is designed to control the pump during the detection of a movement and/or deformation of the teat only if the animal detection device previously has detected a young animal. In particular, a radio-controlled transceiver, which reads a transponder assigned to the animal, can be used as the animal detection device. For this, the animal detection device can have an antenna, which is arranged near the teat. The controller can then assess in particular the associated age of the animal based on the read-out identification of the animal. A young animal is identified and a training process is triggered only if the age lies below a specified threshold.

In one embodiment, a check valve is arranged in the connection line between the mixing container and the branch point. The check valve prevents parts of the food product from being delivered back to the mixing container during delivery of the liquid food product towards the branch point. The entire volume flow delivered by the pump thus flows from the branch point towards the teat.

In one embodiment, a valve is arranged in the connection line between the branch point and the teat and the controller is designed to control the valve. The valve can be in particular a clamp valve. The valve can be used for different purposes, for example in order to prevent a sucking of air through the teat during a cleaning process, in which the pump should suck a cleaning agent out of the mixing container. A closing of the valve can also be wise, in order to blow out the connection line between the branch point and the mixing container with air, which is delivered by the pump towards the branch point.

In one embodiment, the connection line between the branch point and the teat has a length of 0.5 m or less. An even shorter length of 0.25 m or less is also possible. This enables a quick reaction to a movement and/or deformation of the teat, because the distance between the branch line and the teat is bridged after very short delivery times and the liquid food product exits the teat correspondingly quickly.

In one embodiment, the pump is a hose pump. A hose pump can be operated particularly easily in both delivery directions and can also be cleaned very easily.

The invention is explained in greater detail below based on an exemplary embodiment shown in a FIGURE.

BRIEF DESCRIPTION OF THE DRAWING

FIG. 1 shows a device for automatically feeding calves in a schematic representation.

DETAILED DESCRIPTION OF THE INVENTION

The device comprises an automatic feeder 34, in which a mixing container 10 and a controller 22 are arranged. In particular, milk powder and warm water can be added to the mixing container and mixed together using a stirring unit. This mixing process can be controlled by the controller 22.

The mixing container 10 is connected with the teat 12 via the connection line 14. The connection line 14 can have for example a length in the range of 2 m to 6 m. A branch line 16 branches off from the connection line 14 at a branch point 18, which is removed from the teat 12 by approximately 0.5 m or less.

The branch line 16 is arranged on a hose pump 20, with which a liquid in the branch line 16 can be delivered in both directions. The end of the branch line 16 removed from the branch point 18 is open and can be used for example to drain residual liquid or cleaning agent from the mixing container 10. A check valve 30, which prevents a liquid flow towards the mixing container 10, is arranged between the mixing container 10 and the branch point 18.

The end of the connection line 14 removed from the mixing container 10 is connected with a teat 12. A clamp valve 32, with which the connection line 14 can be blocked, is arranged between the branch point 18 and the teat 12.

The teat 12 is fastened on a holder 24 in the form of a holding plate that is pivotably mounted around a horizontal axis 50. The holder 24 is moveably fastened on a wall 48, for example a wall of a calf crate. If the teat 12 is raised with respect to the marked position, a magnetic switch 26, which has a reed contact and works together with a magnet 36 arranged on the holder 24, is activated. The magnetic switch 26 is connected with the controller 22 via a first electrical line 38. The hose pump 20 is connected with the controller 22 via a second electrical line 40. This makes it possible for the controller 22, upon detection of a movement of the teat 12, registered by an activation of the magnetic switch 26, to control the pump 20 such that liquid food product located in the branch line 16 is delivered towards the branch point 18 and namely for a period time that is measured such that the liquid food product makes its way up to the teat 12 and a small amount of liquid also exits from the teat 12.

The controller 22 is connected with the clamp valve 32 via a third electrical line 42 and can open and close it.

Moreover, an animal detection device 28 is indicated, which is connected with the controller 22 via a fourth electrical line 46. The animal detection device 28 can read a transponder fastened to an animal located near the teat 12 so that the controller 22 can detect a young animal and then trigger a training process during the detection of a movement and/or deformation of the teat 12. If, however, the animal detection device 28 detects an older animal, a training process does not need to be triggered.

The invention claimed is:

1. A device for automatically feeding calves with
   a mixing container (10) for mixing a liquid food product,
   a teat (12),
   a connection line (14), which connects the mixing container (10) with the teat (12),
   a branch line (16), which branches off from the connection line (14) at a branch point (18) and connects the connection line (14) with a pump and
   a controller (22) for controlling the pump (20), characterized in that
   a sensor is arranged on the teat (12), which is connected with the controller (22) and is designed to detect a movement and/or deformation of the teat (12), and
   the controller (22) is designed to control the pump during detection of a movement and/or deformation of the teat (12) such that liquid food product is delivered out of the branch line (16) towards the branch point (18) until liquid food product exits the teat (12).

2. The device according to claim 1, wherein the sensor is arranged such that it detects a raising of the teat (12).

3. The device according to claim 1, wherein the teat (12) is fastened on a moveably mounted holder (24) and the sensor is arranged such that it detects a movement of the holder (24).

4. The device according to claim 1, wherein the sensor is arranged within the teat (12).

5. The device according to claim 1, wherein the sensor is a magnetic switch (26).

6. The device according to claim 1, wherein that the sensor is a proximity switch.

7. The device according to claim 1, wherein the controller (22) is designed to control the pump during detection of a movement and/or deformation of the teat (12) such that the liquid food product is delivered for a specified period of time in the range of 0.1 s to 2 s and the pump is then switched off.

8. The device according to claim 1, wherein the device has an animal detection device (28), which is connected with the controller (22), and the controller (22) is designed to control the pump during the detection of a movement and/or deformation of the teat (12) only if the animal detection device (28) previously has detected a young animal.

9. The device according to claim 1, wherein a check valve (30) is arranged in the connection line (14) between the mixing container (10) and the branch point (18).

10. The device according to claim 1, wherein a valve (32) is arranged in the connection line (14) between the branch point (18) and the teat (12) and the controller (22) is designed to control the valve (32).

11. The device according to claim 1, wherein the connection line (14) between the branch point (18) and the teat (12) has a length of 0.5 m or less.

12. The device according to claim 1, wherein the pump is a hose pump (20).

\* \* \* \* \*